(12) United States Patent
Marshall

(10) Patent No.: US 9,660,891 B2
(45) Date of Patent: May 23, 2017

(54) METHODS AND SYSTEMS FOR COMPUTER MONITORING

(71) Applicant: TravelClick, Inc., New York, NY (US)

(72) Inventor: David Marshall, Naples, FL (US)

(73) Assignee: TravelClick, Inc., New York, NY (US)

( * ) Notice: Subject to any disclaimer, the term of this patent is extended or adjusted under 35 U.S.C. 154(b) by 480 days.

(21) Appl. No.: 14/158,197

(22) Filed: Jan. 17, 2014

(65) Prior Publication Data

US 2014/0201360 A1 Jul. 17, 2014

Related U.S. Application Data

(60) Provisional application No. 61/753,911, filed on Jan. 17, 2013.

(51) Int. Cl.
*H04L 12/26* (2006.01)
*H04L 29/08* (2006.01)

(52) U.S. Cl.
CPC .... *H04L 43/0888* (2013.01); *H04L 29/08153* (2013.01); *H04L 43/08* (2013.01); *H04L 43/16* (2013.01); *H04L 67/1008* (2013.01)

(58) Field of Classification Search
CPC . G06F 11/3409; G06F 11/3419; G06Q 10/04; G06Q 10/06; H04L 12/66; H04L 41/5016; H04L 43/0888; H04L 43/08; H04L 43/16; H04L 29/08153; H04L 67/1008

See application file for complete search history.

(56) References Cited

U.S. PATENT DOCUMENTS

| | | | | |
|---|---|---|---|---|
| 6,473,721 | B1* | 10/2002 | Chacon | G06Q 10/06 702/177 |
| 8,069,240 | B1* | 11/2011 | Ybarra, III | H04L 41/5016 709/224 |
| 2005/0086335 | A1* | 4/2005 | Liu | G06Q 10/04 709/223 |
| 2009/0287744 | A1* | 11/2009 | Bernardini | G06F 11/3419 |
| 2010/0094592 | A1* | 4/2010 | Cherkasova | G06F 11/3409 702/182 |
| 2010/0180033 | A1* | 7/2010 | Abdelal | H04L 12/66 709/226 |
| 2011/0093253 | A1* | 4/2011 | Kraft | G06F 11/3419 703/21 |

* cited by examiner

*Primary Examiner* — Le H Luu
(74) *Attorney, Agent, or Firm* — Hodgson Russ LLP

(57) ABSTRACT

Methods and systems for deriving metrics for service and/or computer (e.g., server) utilization and stability from instrumentation of applications showing Poisson characteristics are disclosed. Such methods and systems may be further applied to automatically act upon the conditions indicated by the derived metrics, for example, to provision additional virtual server resource(s) in a cloud-based system.

5 Claims, 2 Drawing Sheets

METHODS AND SYSTEMS FOR COMPUTER MONITORING

CROSS-REFERENCE TO RELATED APPLICATIONS

The present application claims the benefit of the earlier filing date of U.S. Provisional Patent Application No. 61/753,911, filed Jan. 17, 2013.

FIELD OF THE INVENTION

The disclosure relates to methods and systems for using custom application instrumentation to derive application-specific techniques for monitoring performance.

BACKGROUND OF THE INVENTION

The use of variance analysis as a trigger for alarms is known for distilling key information from a plethora of data points. However, too much non-specific information hinders the ability to monitor and measure the performance of computer systems. The understanding of system performance characteristics increases significantly the application code is instrumented to provide useful data for measuring the particular application. When source code is accessible application developers may employ a simple, static approach where calls to a metrics package are inserted at appropriate points in the application code. If source is not available instrumentation may be possible using dynamic techniques such as Aspect-Oriented-Programming (AOP) to gather metrics via aspects deployed at well-defined point-cuts.

However, previous techniques for the use of application-specific metrics provide only first-order data which must be interpreted by an operator to be useful.

BRIEF SUMMARY OF THE INVENTION

The present invention is directed to methods and systems for deriving metrics for service and/or computer utilization (e.g., server) and stability from instrumentation of applications showing Poisson characteristics. Such methods and systems are useful for, and may further comprise, automatically acting upon the conditions indicated by the derived metrics, for example, to provision additional virtual server resource(s) in a cloud-based system.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE INVENTION

Instrumentation

Figure 1:
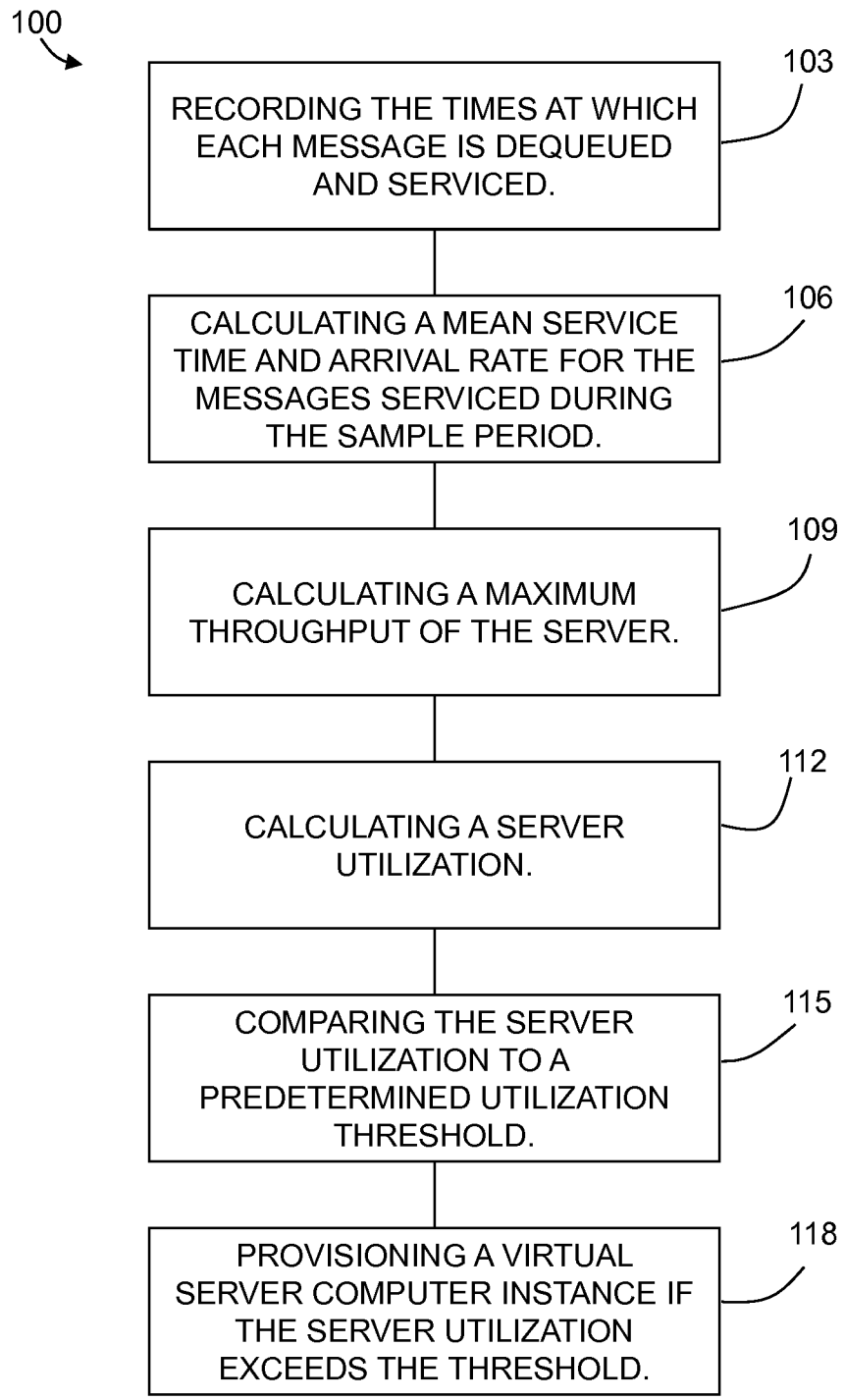
FIG. 1 is a flowchart depicting a method according to an embodiment of the present disclosure.
Figure 2:
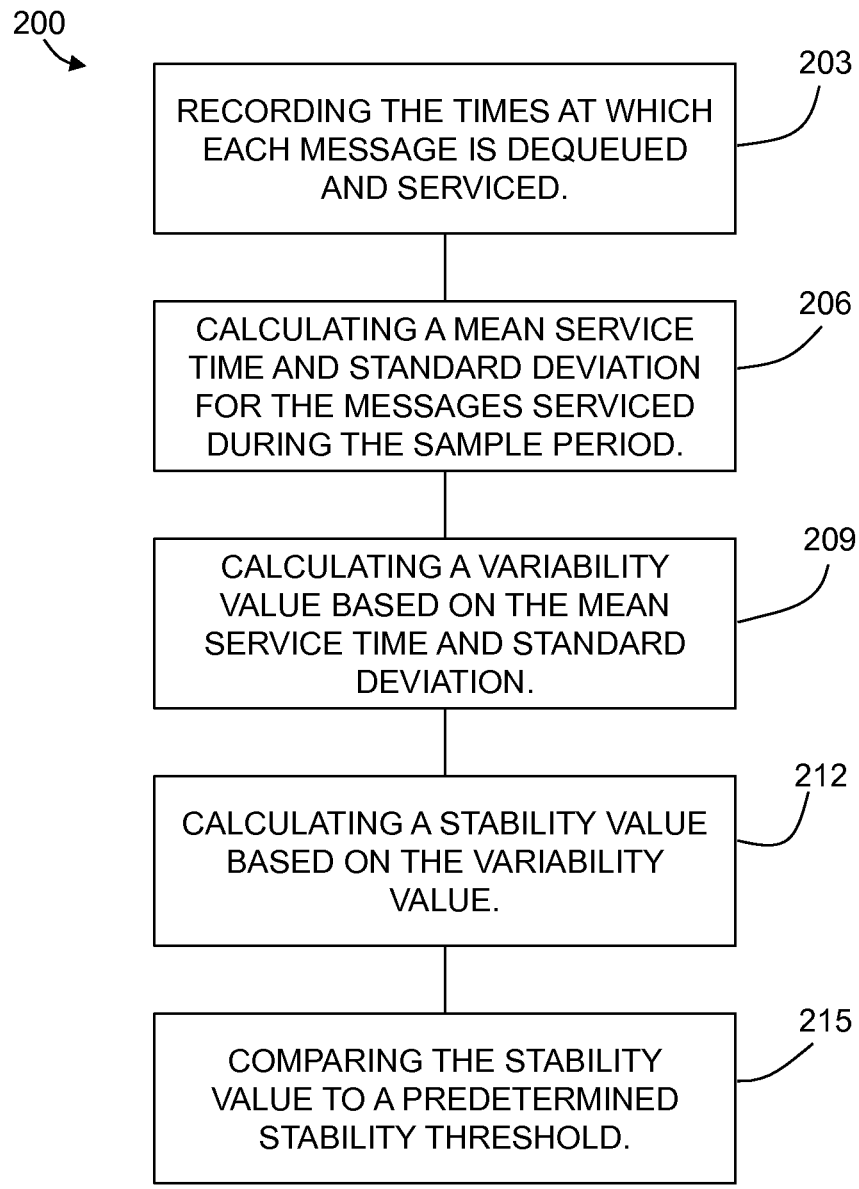
FIG. 2 is a flowchart depicting a method according to another embodiment of the present disclosure.

The essential categories of metrics gathered here may be considered to be time-based:

"wait time" is the time between enqueuing a message on the input queue for a particular service center and the time the same message is dequeued for service.

"service time" is the time between dequeuing a message for service and the completion of that service.

The data used for the metrics may be collected and analyzed during one or more discrete sample periods. Such sample periods may be long enough to contain statistically significant sample sizes, yet short enough for the population to have similar characteristics in terms of workload and performance. Exemplary embodiments have been implemented using intervals of one minute (for high-volume systems) and five minutes (for moderate-volume systems) with good results, but should not be limited to only such examples. In some embodiments, two sets of statistics may be maintained: (1) full period statistics representing the entire population since application startup; and (2) interval statistics periodically reset according to a known frequency (e.g., one minute). Interval statistics may be derived by calculating the change between subsequent readings of full-period statistics.

For each of these sets, the following data points and statistics are collected in exemplary embodiments:

timestamp: the time the sample was taken interval: time since the previous sample (or uptime for full-period statistics)

count: population size m: maximum concurrent service points service min: minimum service time of any item in the sample service max: maximum service time of any item in the sample service $\mu$: mean service time service $\sigma$: standard deviation on service time wait min: minimum wait time of any item in the sample wait max: maximum wait time of any item in the sample wait $\mu$: mean wait time wait $\sigma$: standard deviation on wait time Instrumenting an application may be accomplished such that very little overhead is required. Even calculating a running mean and variance is efficient when a good algorithm is employed.

Harvesting Statistics

It may be convenient to distinguish between statistics collection and statistics harvesting. Whereas statistics collection is the domain of any instrumentation package, statistics harvesting is preferably done by an external agent. This approach has the benefits of: (1) allowing different harvesting techniques independent of collection; and (2) separation of concerns. Statistics gatherers may invite inspection (e.g., a JMX MBean on a java-based system), or publish events (e.g., to a log file or an event stream available to a continuous-event-processing ("CEP") engine).

Two useful metrics gathered as part of the exemplary instrumentation are: (1) mean service time; and (2) throughput. Knowing these values, and measuring them at discrete intervals, allows for the application of queuing theory concepts for both monitoring and capacity planning purposes.

Application of queuing theory to running systems

Queuing theory can be applied as a modeling tool to predict performance in queuing systems when behavior is understood. Here, Little's law is applied to a running system to dynamically derive a utilization metric. This technique is applicable to any open system with Poissonian arrivals and exponential service characteristics. Known statistical tests may be applied to determine if a given data set is Poissonian.

Little's law defines the relationship between the mean queue length (Q), the expected arrival rate (λ) and the mean resident time (R) in a stable queuing system:

$$Q = \lambda R \quad (1)$$

In a transactional system in a steady state, throughput (X) may be considered to be equal to λ:

$$X = \lambda \quad (2)$$

To maintain a steady state, sufficient service resources must be available to handle Q work items simultaneously. The measure of the number of concurrent servers (or serving resources) is given by m. In many configurations m is constant or limited by a predetermined upper bound.

Considering again the steady state, and given that mean service time (S) is known through instrumentation, Erlang's equations predict R≈S.

Little's law is applied to calculate the maximum throughput ($X_{max}$) at a mean service time (S) on a queuing system with maximum concurrency ($m_{max}$):

$$X_{max} = \frac{m_{max}}{S} \quad (3)$$

As $m = m_{max}$ is usually known and constant, a simple function for maximum throughput for a given mean service time (S) is obtained as:

$$X_{max}(S) = \frac{m}{S} \quad (4)$$

Utilization

The concept of utilization monitoring is known to those skilled in the art of monitoring computer systems/servers; for example, CPU and memory utilization data are captured and charted as a standard part of many monitoring regimens. However, without examining and understanding a system's behavior in light of its throughput limit $X_{max}$, it is possible for a system to reach a point where performance suffers well before CPU utilization or other common measures are a concern.

To confound things further, this throughput limit may change dynamically. For example, in modern business systems major portions of service time are spent in one or more I/O wait states (e.g., waiting for disk, waiting for a lock, waiting for a database response). Changes in the performance characteristic of an I/O resource that cause increases in mean service times cause a corresponding decrease in maximum throughput $X_{max}$. When actual arrival rates exceed this limit (λ>$X_{max}$) a backlog results. If new work units continue to arrive at the same rate, queue depth builds quickly and the once-stable system enters a failing state. The present disclosure provides methods and systems to present a computer system's utilization from a queuing theoretic viewpoint. In this manner, such behavioral dynamics may be accounted for in a simple, well understood format.

The present invention may be embodied as a computer-based method 100, such as, for example, that depicted in FIG. 1, for monitoring utilization of a server computer during a sample period. The server computer may be an transactional server configured to perform services requested via received messages (i.e., servicing the messages). The server is instrumented to provide data which is relevant to the particular transactions of the application. The method 100 comprises the step of recording 103, in an electronic file, the time at which each message is dequeued and the time at which each message has been serviced. For example, the time at which each event occurs may be recorded in a log file or a memory location.

A mean service time is calculated 106 by the computer, for the messages serviced during the sample period. Additional details related to the method 100 are provided under the heading "Utilization Exemplary Embodiment and Discussion" below. For example, a service time may be calculated for each message, and a mean derived using the service times. The arrival rate of the messages may be calculated 106 as well. For example, the number of messages arriving per unit of time (e.g., per second, per 10 seconds, etc.) may be calculated 106 as the arrival rate.

A maximum throughput of the server may be calculated 109 based on the mean service time and a concurrency value representing the maximum number of transaction servers available. The concurrency value may be resident as an environmental variable, stored in a configuration file of the server, passed to the method software as a parameter, or otherwise provided.

A server utilization is calculated 112 as a ratio of the measured throughput (from the mean service time and arrival rate) and the calculated maximum throughput. The calculated server utilization is compared 115 to a utilization threshold to determine server capacity.

The method 100 may further comprise the step of provisioning 118 a server computer instance if the calculated server utilization exceeds the utilization threshold. In this manner, a provisioning service may be automated to preemptively address server capacity. Such an automated method is especially useful in a cloud-based, Hardware-as-a-Service environment, where servers may be provisioned and/or decommissioned without operator intervention.

The present disclosure may be embodied as a non-transitory medium having computer-readable instructions for causing a processor to perform embodiments of the method 100. The present disclosure may be embodied as a system 10 comprising a processor 12. The system 10 may further comprise a network interface 14 in electronic communication with the processor 12. The processor 12 may be programmed to perform embodiments of method 100. For example, the processor 12 may be programmed to determine the time at which each of a plurality of messages, received at the network interface 14, is dequeued and the time at which each message has been serviced; calculate a mean service time and an arrival rate for the messages serviced during the sample period; calculate a maximum throughput of the computer based on the mean service time and a concurrency value; calculate a computer utilization based on the measured throughput and the calculated maximum throughput; and compare the calculated computer utilization to a utilization threshold to determine computer overcapacity.

Utilization Exemplary Embodiment and Discussion

The disclosed current utilization (U) is a measure of current throughput (X) relative to maximum throughput ($X_{max}$):

$$U(X, S) = \frac{XS}{m} \quad (5)$$

Throughput will increase or decrease in unison with changes in arrival rate λ, provided Little's law is satisfied, so:

$$\lambda = Q/R \quad (6)$$

However, if mean service times increase, resident time will increase and the throughput ceiling $X_{max}$ decreases accordingly.

Determining m

Concurrency in a transactional queuing system is described by m, representing the number of simultaneous servers operating at the same service center. In multi-threaded architectures, m represents the maximum concurrent worker threads that may be utilized at a given service center. If work is being performed by a pool of threads, m represents the number of threads in the pool. For multi-process architectures (e.g., traditional Unix forking servers such as Apache httpd 1.3), m represents the number of worker processes.

It is preferred to constrain m via a configured upper-bound to prevent runaway resources during periods of unusual peak demand. The overhead of thread or process creation and destruction is well-known and this overhead has led to the standard practice of using pooled workers.

If it is not possible to determine m at runtime when reporting or harvesting statistics, the value of m may be passed as a parameter.

Stability Metrics

In another embodiment of the present invention, a method 200 is provided to derive a measure of service stability by examining variability in mean service times for an instrumented service. Transactional and computational services in computer systems are considered to exhibit an exponential distribution when stable (provided work arrives according to a Poisson process).

A computer-based method 200 for monitoring the stability of a server computer comprises recording 203, in an electronic file, the time at which each message is dequeued and the time at which each message has been serviced. For example, the time at which each event occurs may be recorded in a log file or a memory location.

A mean service time and standard deviation are calculated 206 by the computer, for the messages serviced during the sample period. Additional details related to the method 200 are provided under the heading "Stability Exemplary Embodiment and Discussion" below. For example, a service time may be calculated for each message, and the mean and standard deviation derived using the service times.

The method 200 comprises the step of calculating 209 a variability value based on the mean service time and stand deviation of service times (here again, further details are provided below). A stability value is calculated 212 based on the variability value and a predetermined dampening factor, and the stability value is compared 215 to a stability threshold to determine the stability of the server.

The present disclosure may be embodied as a non-transitory medium having computer-readable instructions for causing a processor to perform embodiments of the method 200. The present disclosure may be embodied as a system 50 comprising a processor 52. The system 50 may further comprise a network interface 54 in electronic communication with the processor 52. The processor 52 may be programmed to perform embodiments of method 200. For example, the processor 52 may be programmed to determine a time at which each of a plurality of messages, received at the network interface 54, is dequeued and the time at which each message has been serviced; to calculate a mean service time and a standard deviation of service times for the messages serviced during the sample period; to calculate a variability value based on the mean service time and stand deviation of service times; to calculate a stability value based on the variability value and a predetermined dampening factor; and to compare the stability value to a stability threshold to determine computer stability.

Stability Exemplary Embodiment and Discussion

An useful characteristic of an exponential distribution is a coefficient of variation $C_v$ of 1. The coefficient of variation is given by the equation:

$$C_v(\sigma, \mu) = \frac{\sigma}{\mu} \quad (7)$$

When $C_v > 1$ a sample population exhibits behavior better fitted to a hyper-exponential distribution, the greater the coefficient, the less predictable or stable the outcome. The present stability metric is a measure of how far $C_v$ deviates from the expected norm of 1. The greater the deviation, the less the stability.

In an embodiment of the stability metric, stability (S) was assumed to be 100% at $C_v=1$, and reach 0% as $C_v$ approaches 2:

$$S(\sigma, \mu) = 1 - (C_v - 1) \quad (8)$$

A dampening factor D was introduced to soften the gradient of the stability line. As such the dampening factor may be adjusted based on operational experience, with a suitable value being chosen to complement the behavior of the particular system being measured. Accordingly, the stability equation of (8) is adjusted to:

$$S(\sigma, \mu) = 1 - \frac{C_v - 1}{D} \quad (9)$$

In practice, a dampening factor of D=1.5 was found to be a suitable initial value when fitting to a new system's characteristics.

As this is to be a dimensionless metric, the result is preferably normalized to fall within the closed interval [0, 1]. Accordingly, stability equation (9) is normalized as:

$$S(\sigma, \mu) = \begin{cases} 1 & \text{if } \frac{C_v - 1}{D} \leq 1 \\ 0 & \text{if } \frac{C_v - 1}{D} \geq 1 \\ 1 - \frac{C_v - 1}{D} & \text{otherwise} \end{cases} \quad (10)$$

Aggregating Stability Metrics

Modern systems, such as Service-Oriented Architecture ("SOA") implementations, offer multiple types of messages or services, each with different performance characteristics. It is often useful to combine stability metrics for several service types to produce an overall stability metric applicable to a server or server cluster. If component statistics exhibit significantly different mean service times, a stability metric that is typeless and based on the total population will exhibit a counter-intuitive Yule-Simpson effect. The corresponding stability metric will yield a lower value than the stability of the constituent types.

To counter this effect, a weighted arithmetic mean of component stability metrics may be calculated when considering such aggregations. Each given type with stability $S_i$ may be weighted according to its frequency of occurrence $f_i$ within the measurement interval. Combining all such types, yields:

$$\overline{S} = \frac{\sum_{i=1}^{n} f_i S_i}{\sum_{i=1}^{n} f_i} \quad (11)$$

It should be noted a computer of the present disclosure may monitor itself or other computers (e.g., servers). Furthermore, although processors are described, it is to be appreciated that the processors may be implemented in practice by any combination of hardware, software, and firmware. Also, its functions as described herein may be performed by one unit, or divided up among different components, each of which may be implemented in turn by any combination of hardware, software, and firmware.

Although the present invention has been described with respect to one or more particular embodiments, it will be understood that other embodiments of the present invention may be made without departing from the spirit and scope of the present invention. Hence, the present disclosure is deemed limited only by the appended claims and the reasonable interpretation thereof.

What is claimed is:

1. A computer-based method for monitoring utilization of a server computer during a sample period, the server computer servicing received messages, the method comprising the steps of:

recording, in an electronic file, the time at which each message is dequeued and the time at which each message has been serviced;

calculating, using the computer, a mean service time and an arrival rate for the messages serviced during the sample period;

calculating, using the computer, a maximum throughput of the server based on the mean service time and a concurrency value;

calculating a server utilization based on the measured throughput and the calculated maximum throughput;

comparing the calculated server utilization to a utilization threshold to determine server overcapacity.

2. The method of claim 1, further comprising the step of provisioning a server computer instance if the calculated server utilization exceeds the utilization threshold.

3. The method of claim 1, wherein the concurrency value is stored in an electronic file of the server computer.

4. The method of claim 1, wherein the concurrency value is a received parameter.

5. A computer-based method for monitoring the stability of a server computer, the method comprising the steps of:

recording, in an electronic file, the time at which each message is dequeued and the time at which each message has been serviced;

calculating, using the computer, a mean service time and a standard deviation of service times for the messages serviced during the sample period;

calculating a variability value based on the mean service time and stand deviation of service times;

calculating a stability value based on the variability value and a predetermined dampening factor; and comparing the stability value to a stability threshold to determine server stability.

* * * * *